(12) United States Patent
Simons

(10) Patent No.: US 6,323,754 B1
(45) Date of Patent: Nov. 27, 2001

(54) TWO-WAY TELECOMMUNICATIONS SYSTEM

(75) Inventor: Paul R. Simons, Crawley (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/108,355

(22) Filed: Jul. 1, 1998

(30) Foreign Application Priority Data

Jul. 2, 1997 (GB) .................................................. 9713904

(51) Int. Cl.⁷ ...................................................... G08B 5/22
(52) U.S. Cl. .......................................... 340/7.43; 340/7.28
(58) Field of Search ............................... 455/72, 103, 442, 455/435, 436, 437, 438, 439, 440, 441, 443, 38.1, 45, 186.1, 185.1, 561, 566, 567, 31.3, 517, 38.4, 458; 340/525.44, 7.22, 7.43; 370/311

(56) References Cited

U.S. PATENT DOCUMENTS

| | | | |
|---|---|---|---|
| 5,182,553 | 1/1993 | Kung | 340/825.44 |
| 5,185,604 | 2/1993 | Nepple et al. | 340/825.44 |
| 5,347,269 | 9/1994 | Vanden Heuvel et al. | 340/825.44 |
| 5,552,779 | * 9/1996 | Gaskill et al. | 340/825.44 |
| 5,629,940 | * 5/1997 | Gaskill | 370/311 |
| 5,881,365 | * 3/1999 | Yang et al. | 455/45 |
| 5,892,455 | * 4/1999 | Matsumoto | 340/825.44 |
| 5,970,122 | * 10/1999 | LaPorta et al. | 379/67.1 |

FOREIGN PATENT DOCUMENTS

WO9635267   7/1996   (WO) .............................. H04B/7/00

* cited by examiner

*Primary Examiner*—Nguyen T. Vo
*Assistant Examiner*—Naghmeh Mehrpour
(74) *Attorney, Agent, or Firm*—Jack D. Slobod

(57) ABSTRACT

A two-way telecommunications system includes a primary station (10, 14, 16) and a secondary station (18, 20). The primary station is arranged for transmitting on a downlink a data message together with indicia representative of status messages it wants to receive from the secondary station. The secondary station in response to the indicia represents the desired status items as icons and when the user has taken an action affecting the status, it transmits a status message on the uplink and changes the representation of the icon. The icons are stored with the message until the latter is erased.

20 Claims, 4 Drawing Sheets

TWO-WAY TELECOMMUNICATIONS SYSTEM

BACKGROUND OF THE INVENTION

1. Field of the Invention

The present invention relates to a two-way telecommunications system comprising a primary station for transmitting messages on a downlink and at least one secondary station for transmitting signals on an uplink and to a secondary station for use in the telecommunications system.

2. Description of the Related Art

For convenience of description the present invention will be described with reference to an acknowledgement back (or back-back) paging system but it can be applied to specific applications of a paging system, for example relaying data to a computer terminal, to cellular and cordless telephone systems and private mobile radio systems.

When a primary station transmits a message which requires a response, even if receipt of the message is acknowledged, perhaps automatically, the primary station has no means of knowing if the message has been read unless a reply has been sent on the uplink. A busy user of a secondary station not only wants to know that he has received a message but also needs to be reminded that the message needs to be answered.

The use of icons to indicate the receipt of messages by a pager and of duplicates of a previously received message is known from U.S. Pat. No. 5,347,269. However once a message has been read by the pager user the relevant icons are no longer displayed. U.S. Pat. No. 5,182,553 discloses a pager which displays a variety of functions as icons. If one of the icons is selected using a cursor, that icon is displayed by inverted video until it is deselected. Finally U.S. Pat. No. 5,552,779 discloses a wrist watch pager in which icons are used to represent common types of paging messages to a user.

OBJECT AND SUMMARY OF THE INVENTION

An object of the present invention is to represent and relay status information in a user friendly manner.

According to one aspect of the present invention there is provided a telecommunications system comprising a primary station for transmitting messages on a down-link and at least one secondary station for transmitting signals on an up-link, characterised in that the primary station includes in the down-link message indicia indicating status information associated with the down-link message which it wants to be transmitted on the up-link by the at least one secondary station, and in that the at least one secondary station comprises means for recovering the down-link message and said indicia, means for displaying the down-link message and for displaying the indicia as at least one icon, means responsive to a user of the secondary station taking an action affecting the status information, for transmitting a signal on the up-link and for altering the representation of the or at least one of the icons.

According to a second aspect of the present invention there is provided a secondary station for use in a telecommunications system in which a primary station transmits a message on a downlink together with indicia indicating status information associated with the downlink message which it wants transmitted on the uplink by the secondary station, characterised in that the secondary station comprises means for recovering the down-link message and said indicia, means for displaying the down-link message and for displaying the indicia as at least one icon, means responsive to a user of the secondary station taking an action affecting the status information, for transmitting a signal on the up-link and for altering the representation of the or at least one of the icons.

By means of the present invention the originator of a message can indicate to a recipient of the message, what actions by the recipient he/she wants to be informed about and also the recipient is provided with an aide memoire of what actions are to be taken and have been taken. Once an action has been taken, the primary station is informed automatically.

In order to inform a recipient of what actions have been taken, the relevant icons are displayed in reverse video format.

The icons may be displayed in a reserved area of a display screen which is separate from the message display area or may be displayed in tabular form.

The icons assigned to a message are stored by the secondary station and recalled each time the message is read-out and displayed so that the recipient is reminded of what actions he/she has taken and what actions need to be taken. When the message is erased, the icons associated with it are erased as well.

The uplink messages may be transmitted as pseudo-random code sequences. An advantage of sending uplink messages in this way is that two or more messages can be transmitted simultaneously without the need for synchronisation.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENTS

Figure 1:
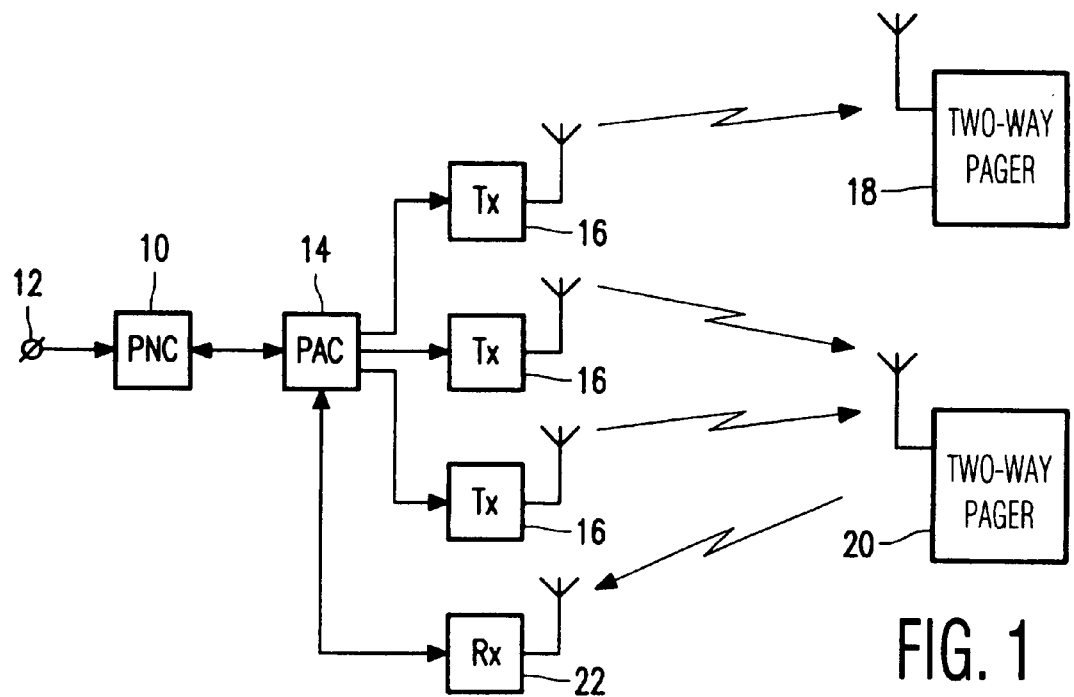
FIG. 1 is a block schematic diagram of a two-way message transmission system.

Referring to FIG. 1, the message transmission system comprises a paging network controller (PNC) 10 having a message entry port 12 which receives pager addresses and associated messages from an operator equipped with a personal computer (PC) or directly from a subscriber having a PC and a modem. The PNC 10, which comprises directories containing information such as pager radio identity codes (RICs), areas to be paged, frequencies, pager types, prevailing protocols, for example POCSAG (or CCIR Radiopaging Code No. 1) and ERMES, and status of the pagers, assembles the messages and their associated RICs together with other relevant information into data packets which are forwarded to a paging area controller (PAC) 14 which formats the RICs and associated messages into a format which can be transmitted by base station transmitters (or transmitter section of a base station transceiver) 16 to two-way pagers 18, 20 respectively, by way of a down-link.

If a two-way pager 20 identifies that a message is being transmitted having its RIC, it receives the message and decodes it. An acknowledgement may be sent automatically by the pager without intervention by the user. Further if the user wishes to send a brief response then, by means of an integral key pad, he selects a pre-stored response and when invited by the PAC 14 it transmits its response by way of an up-link. The response signals may be sent simultaneously as pseudo-random data sequences (PRDS).

One or more receivers (or receiver sections of a transceiver) 22 are provided for receiving the responses and for relaying them to the PAC 14 in which they are decoded and sent as data packets to the PNC 10. The PNC 10 comprises means for analysing the signals and for matching the responses with the messages transmitted on the down-link.

Those responses which are matched are relayed to the respective users in any suitable form, for example by e-mail or by transmission as one-way paging messages. Alternatively the responses are sent to a message answering service operated by the paging network.

Figure 2:
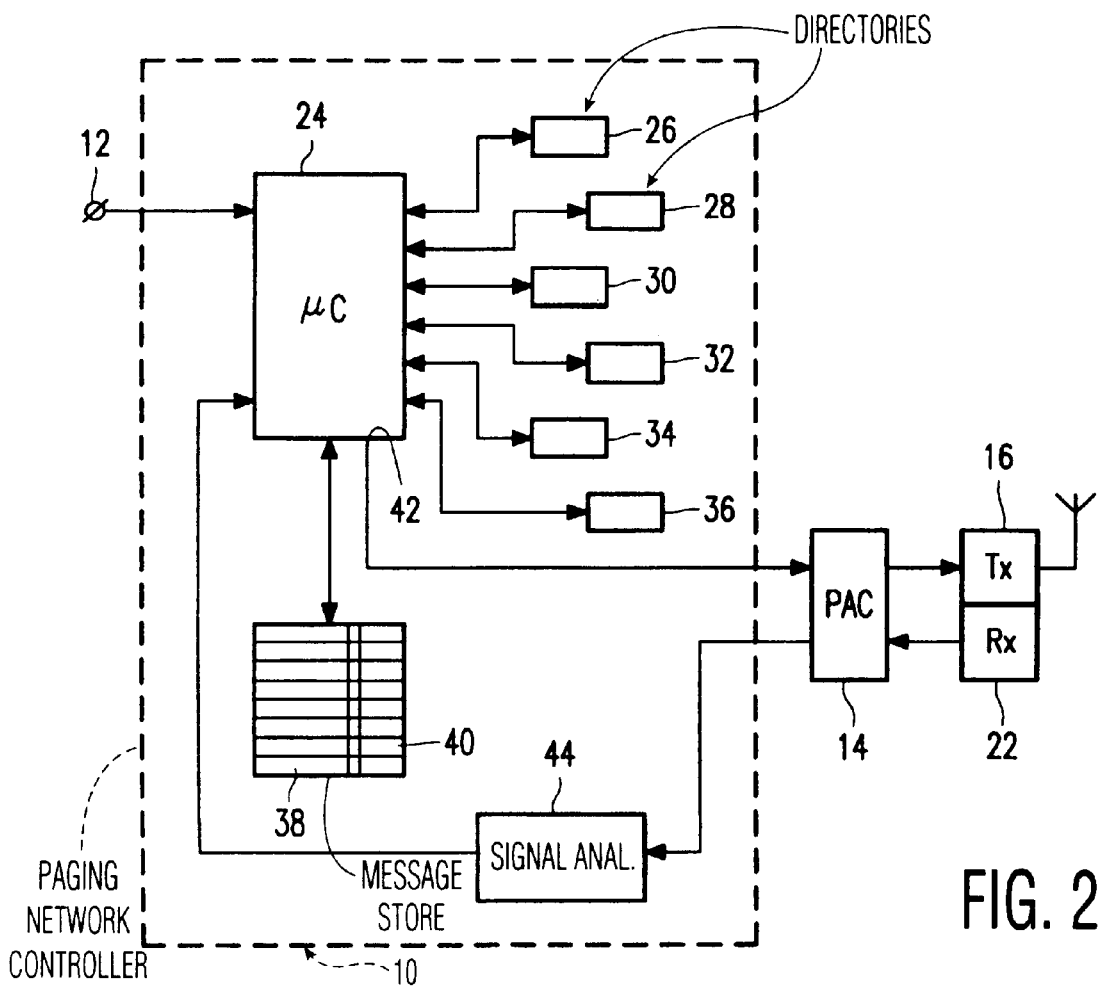
FIG. 2 is a block schematic diagram of the PNC 10 shown in FIG. 1.

FIG. 2 shows in block schematic form a PNC 10 coupled to a PAC 14 and a base station transmitter 16 and a receiver 22. The entry port 12 is coupled to a microcontroller 24 to which are connected directories 26 to 36 relating respectively to RICs, paging areas, frequencies, pager types, prevailing protocols and status. A message store 38 is coupled to the microcontroller 24 for storing messages as they are received at the entry port 12. The store 38 has an area 40 for storing indications such as acknowledgement of receipt of a message by an addressed pager, confirmation that a message has been displayed by the user and confirmation that a response to a respective message has been received. An output 42 from the microcontroller 24 is coupled to the PAC 14 to supply data packets to be formatted prior to being transmitted by the transmitter 16.

Indications and/or responses received by the receiver 22 are relayed to a signal analyser 44 by way of the PAC 14. As each indication and/or response is analysed successfully, it is forwarded to the microcontroller 24 for matching with the messages in the store 38. At an appropriate moment the intended recipients of the information provided by the indications and/or responses are informed, for example by e-mail or a one-way paging message, or the information and/or responses are stored together with the respective pager number so that a subscriber can interrogate the store at his or her convenience. Once the processing of a message, response information and the response itself has been completed the microcontroller 24 erases the corresponding entries in message store 38 and area 40. More conveniently the store 38 can comprise two halves with one half handling the acknowledgements of the messages already sent on the down-link and the other half storing messages to be sent.

Figure 3:
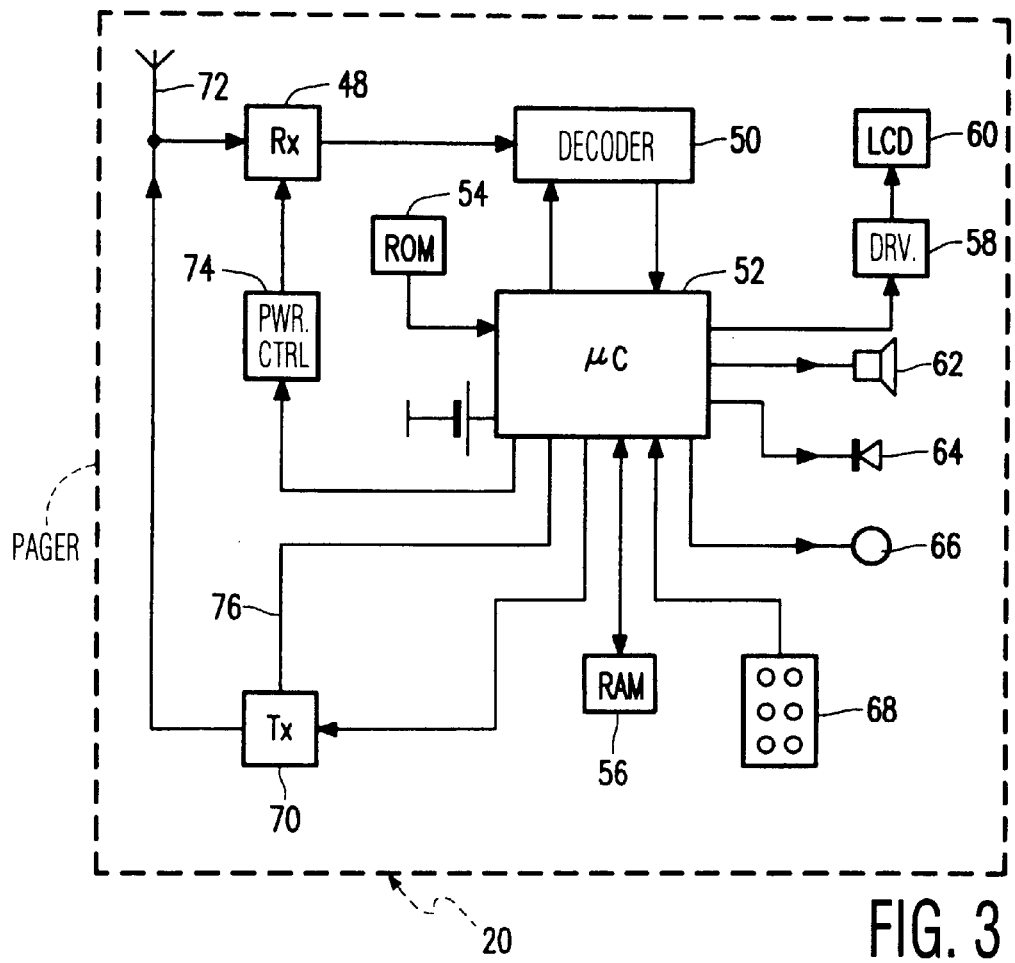
FIG. 3 is a block schematic diagram of a pager.

Referring to FIG. 3, the pager 20 comprises a receiver 48 connected to a decoder 50 which in turn is coupled to a control processor 52. The processor 52 operates in accordance with a program stored in a read-only memory 54. The processor also includes an address store (not shown) which contains the unique addresses of that pager. In the event of the pager receiving a message then it is stored in a random access memory 56. The messages can be displayed subsequently on a LCD panel 60 which has its associated driver 58 coupled to the control processor 52. Annunciating devices which may comprise an acoustic transducer 62, a light emitting transducer 64 and a vibrator 66 are coupled to the control processor 52. A keypad 68 provides a man machine interface whereby a user can instruct the processor to carry out various functions, for example to display a stored message on the LCD panel 60. A transmitter 70 is coupled to an output of the processor 52 and to an antenna 72. A receiver power control stage 74 is coupled between the processor 52 and the receiver 48 in order to practice battery conservation in accordance with the provisions of the paging protocol being followed. In the event of the pager sending response signals as PRDS signals then the control processor 52 comprises means for determining the sequence to be transmitted having regard the identity of the pager and/or information in the original downlink message. The PRDS is then relayed to the transmitter 70 for onward transmission. If as an option power control is to be applied to the transmitter 70 then a power control signal is supplied by the processor 52 through a control line 76.

The response signals may include messages relating to the automatic acknowledgement of a downlink message, to a user displaying a message and to a user sending a reply. Further the signals transmitted on the up-link may also comprise requests for services, such as registration.

When sending a message to a pager, the originator may want to be informed about the message status at the addressee's pager and this information may also be required by the addressee in order to satisfy himself that all the actions required have been taken and that the message can be deleted from the RAM 56.

Figure 4:
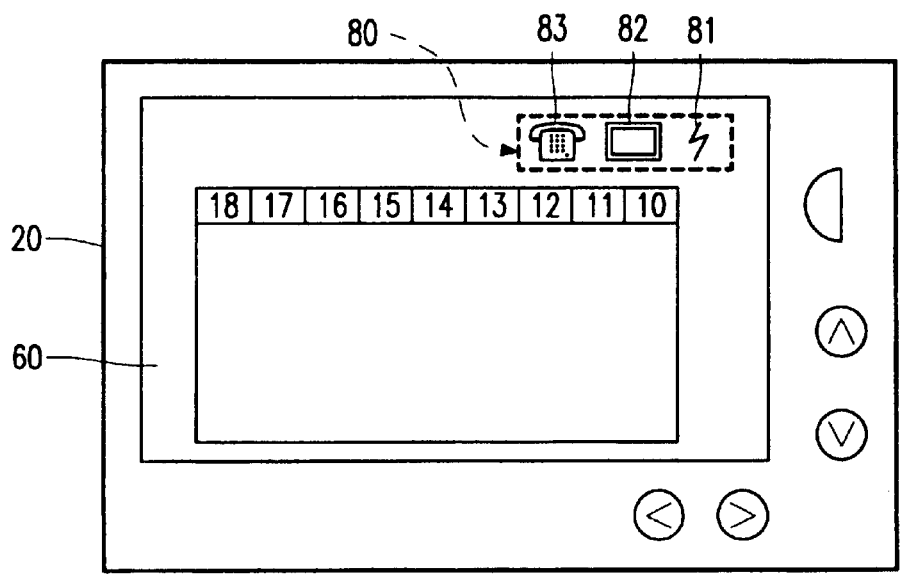
FIG. 4 illustrates on embodiment of the front of a pager.

FIG. 4 illustrates a message pager 20 having a relatively large LCD panel 60. The main area of the display 60 is devoted to displaying the message number and the text of the message. However a marginal area 80 of the display 60 is reserved for displaying message status icons 81, 82, 83. In FIG. 4, the icon 81 represents acknowledgement of the message, the icon 82 represents the message having been displayed by the user and the icon 83 represents that the user has transmitted a response to the message.

The originator of a message specifies what status messages he wants and this information is included in the downlink transmission. At the pager 20 the nature of the required status messages is determined and the microcontroller 52 causes the appropriate icons to be displayed each time the same message is displayed on the display 60. Once the pager automatically or the user manually takes an action affecting the pager's status, that icon is displayed in reverse video format and an appropriate status message is sent by the transmitter 70 on the uplink. The number of icons associated with each message may vary as required. If only acknowledgement of receipt is required then only icon 81 will be displayed. If the originator wants to know that the addressee has also displayed (or read) the message text the icons 81 and 82 are displayed and shown in reverse video format once the respective status message has been transmitted on the uplink. The icon is therefore not only able to convey the type of message but also its status. This allows up to 3 icons (that is 0, 1, 2 or 3 icons) and the reverse video format to represent 16 different combinations of message type and status.

When sending a downlink message. in accordance with the CCIR Radiopaging Code No. 1 (alternatively known as POCSAG), each icon can be identified by a hexadecimal character so that at a maximum one extra code word, compared to the same message not containing icons, will be required which overhead can be tolerated with long data messages.

Figures 5, 6:
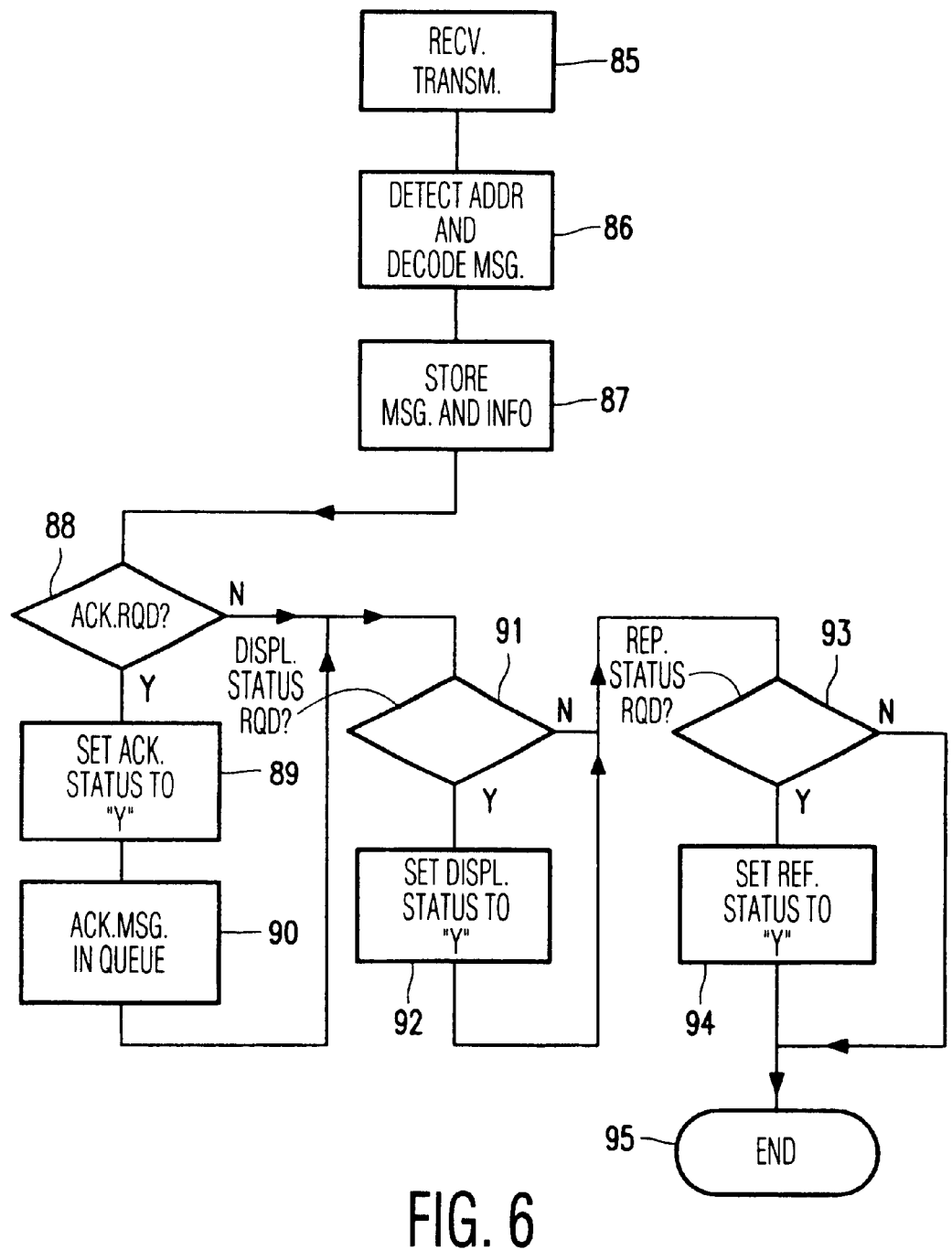
FIG. 5 illustrates a second embodiment of a pager having a message status table.
FIG. 6 is a flow chart illustrating a sequence of operations associated with receiving a message.

FIG. 5 illustrates a message status display in tabular form and before any transmissions have been sent. The table comprises four columns representing, respectively, message number "Mess No", acknowledge "Back", display "Disp" and reply "Rep". Each row of the table represents by Y(yes) or N(no) what actions the originator of the message requires of the recipient. For message No. 1 only an acknowledgement of receipt is required and when this has been done the letter Y is shown in reverse vide. For message No. 2 the originator wants to know when the message has been read, that is, displayed so that the letter Y is shown in the Disp column and the letter N in the other two columns of that row. Needless to say once the message has been read the letter Y is shown in reverse video. Finally, message No. 3 has "Y"s in all three column positions. When the respective actions have been taken and an up-link message sent, the respective letter "Y" is shown in reverse video format. The message and the associated status table entry are retained until the pager user chooses to erase the message which causes the status table entry to be erased simultaneously.

FIG. 6 illustrates a flow chart associated with a pager receiving a message and setting-up the message status table as shown in FIG. 5.

Block 85 relates to the pager receiving a transmission in say its assigned POCSAG frame. Block 86 relates to detecting its address in a message and decoding the message including what message status signals are required. Block 87 relates to storing the message data and information relating to the desired status message icons.

Block 88 relates to checking if an acknowledgement signal is required to be sent on the uplink by the transmitter 70 (FIG. 3). If the answer is yes (Y), then in block 89 Back status is set to Y in the message status table of FIG. 5. In block 90 the Back message is placed in the queue for uplink transmission. The flow chart proceeds to block 91 to which the no(N) output of the block 88 is applied. In the block 91, a check is made if it is required to provide a status message indicating that the message has been displayed. If the answer is yes (Y), in block 92 a Disp status is set to Y in the message status table of FIG. 5.

The flow chart proceeds to block 93 to which the no(N) output of the block 91 is connected. In block 93 a check is made to see if it is required to provide a status message indicating that a reply is to be sent. If the answer is yes (Y), in block 94 the Rep status is set to Y in the message status table of FIG. 5. A terminating or stop block 95 is connected to the block 94 and the no(N) output of the block 93.

Figure 7:
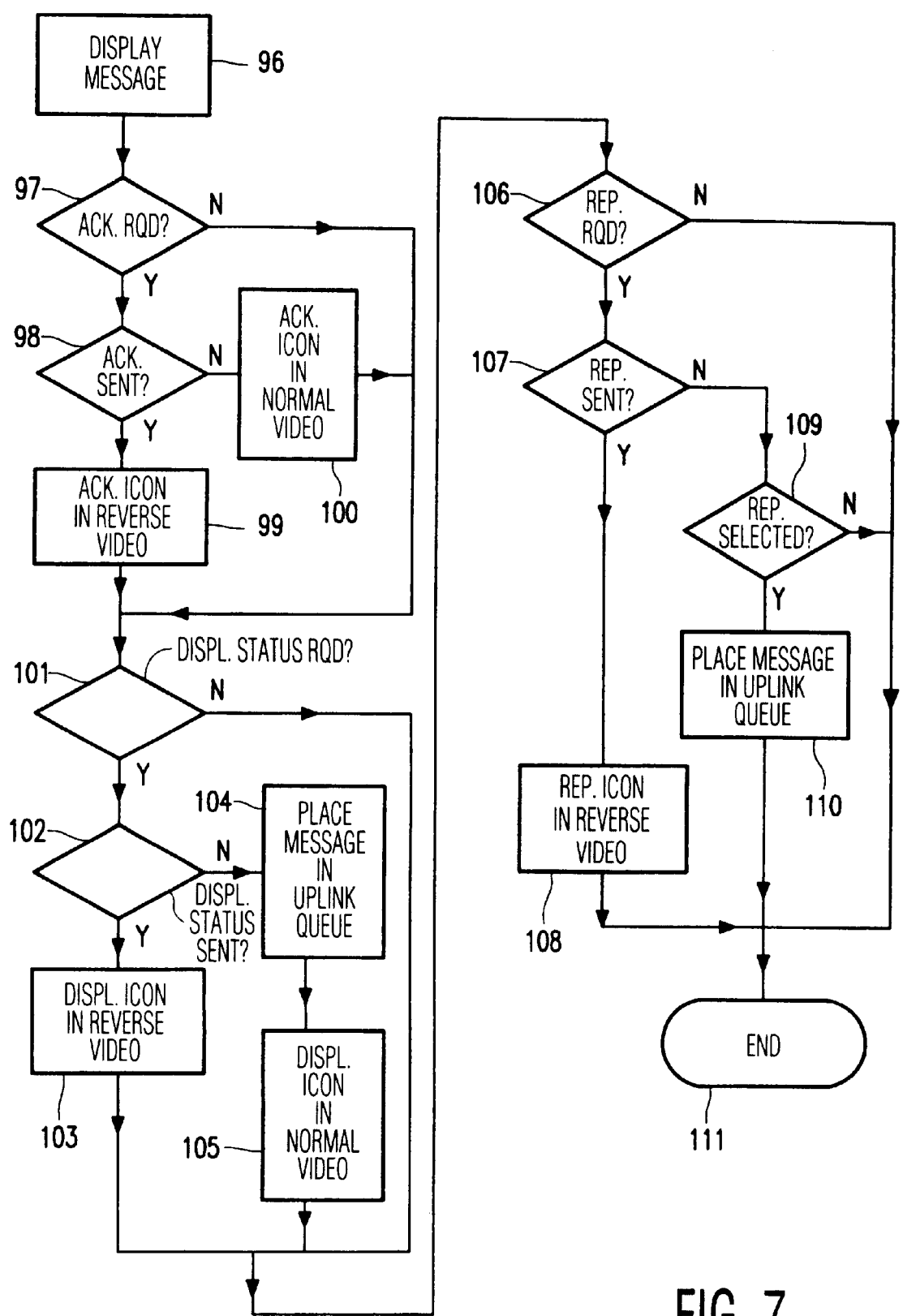
FIG. 7 is a flow chart illustrating a sequence of operations associated with displaying a message.

FIG. 7 illustrates a flow chart of the sequence of events associated with displaying a received message. Block 96 relates to the pager user displaying a message. Block 97 relates to checking if it is necessary to send an Ack message. If the answer is yes(Y) then in block 98 a check is made to see if a message has been sent. If the answer is yes(Y), then in block 99 the Ack icon is displayed in reverse video. If the answer to the check made in block 98 is no(N) then in block 100 the Ack icon continues to be shown in normal video. The no(N) output of the block 97 and the outputs of the blocks 99 and 100 are supplied to block 101 which relates to checking if a message has been read or displayed. If the answer is yes(Y) then in block 102 a check is made to see if a display status has been sent. If the answer is yes(Y) then in block 103 the respective icon is displayed in reverse video. In the event of a no(N) answer in the block 102, then in block 104 a message is placed in the up-link queue and in block 105 the relevant icon remains displayed in normal video. A no(N) output from the block 101 and the outputs from blocks 103 and 105 are jointly supplied to a block 106 in which a check is made to see if it is required to send a reply message. If the answer is yes(Y), in block 107 a check is made to see if a message has been sent. If the answer is yes(Y), block 108 indicates displaying the respective icon in reverse video. If the answer from block 107 is no(N), a check is made in block 109 to see if a reply has been selected. If the answer is yes(Y) then in block 110, the reply message is placed in a queue. No(N) outputs from the blocks 106 and 109 and the output from the block 110 are supplied to a terminating or stop block 111.

From reading the present disclosure, other modifications will be apparent to persons skilled in the art. Such modifications may involve other features which are already known in the design, manufacture and use of two-way telecommunications systems and component parts thereof and which may be used instead of or in addition to features already described herein.

What is claimed is:

1. A telecommunications system comprising a primary station for transmitting downlink messages on a downlink and at least one secondary station for transmitting signals on an uplink, wherein the primary station includes in a downlink message indicia indicating status information associated with the downlink message to be transmitted on the uplink by the at least one secondary station in a status message when said status information is affected by an action taken at the secondary station, and the at least one secondary station comprises means for recovering the downlink message and said indicia, means for displaying the downlink message and for displaying the indicia as representations of one or more icons, means responsive to an action being taken at the secondary station affecting the status information, for transmitting a signal on the uplink including a status message indicating the affected status information and for altering the representation of at least one of the icons.

2. A system as claimed in claim 1, wherein said means responsive to a user of the secondary station taking an action affecting the status information alters the representation of the at least one of the icons by showing the at least one of the icons in reverse video format.

3. A system as claimed in claim 1, wherein the one or more icons are displayed in a reserved area of a display screen which is separate from a message display area.

4. A system as claimed in claim 1, wherein the icons are displayed in a tabular form.

5. A system as claimed in claim 1, data representative of the one or more icons is stored with the associated downlink message, said data representative of the icons being recalled each time the associated downlink message is displayed and the icons are erased when the associated message is erased.

6. A system as claimed in claim 1, wherein there are a plurality of different types of downlink messages, and said indicia distinguishes one message type from another.

7. A secondary station for use in a telecommunications system in which a primary station transmits a downlink message on a downlink together with indicia indicating status information associated with the downlink message to be transmitted on the uplink by the secondary station in a status message when said status information is affected by an action taken at the secondary station, wherein the secondary station comprises means for recovering the downlink message and said indicia, means for displaying the downlink message and for displaying the indicia as one or more representations of icons, means responsive to an action being taken at the secondary station affecting the status information, for transmitting a signal on the uplink including a status message indicating the affected status information and for altering the representation of at least one of the icons.

8. A secondary station as claimed in claim 7, wherein the icons are displayed separately from the message.

9. A secondary station as claimed in claim 7, wherein said means responsive to a user of the secondary station taking an action affecting the status information alters the representation of the at least one of the icons by showing the at least one of the icons in reverse video format.

10. A secondary station as claimed in claim 7, further comprising storage means for storing data representative of the icons together with the associated downlink message.

11. A system as claimed in claim 2, wherein the one or more icons are displayed in a reserved area of a display screen which is separate from a message display area.

12. A system as claimed in claim 2, wherein the icons are displayed in a tabular form.

13. A system as claimed in claim 2, data representative of the one or more icons is stored with the associated downlink message, said data representative of the icons being recalled each time the associated downlink message is displayed and the icons are erased when the associated message is erased.

14. A system as claimed in claim 3, wherein data representative of the one or more icons is stored with the associated downlink message, said data representative of the icons being recalled each time the associated downlink message is displayed and the icons are erased when the associated message is erased.

15. A system as claimed claim 4, wherein data representative of the one or more icons is stored with the associated downlink message, said data representative of the icons being recalled each time the associated downlink message is displayed and the icons are erased when the associated message is erased.

16. A system as claimed in claim 11, wherein data representative of the one or more icons is stored with the associated downlink message, said data representative of the icons being recalled each time the associated downlink message is displayed and the icons are erased when the associated message is erased.

17. A secondary station as claimed in claim 8, wherein said means responsive to a user of the secondary station taking an action affecting the status information alters the representation of the at least one of the icons by showing the at least one of the icons in reverse video format.

18. A secondary station as claimed in claim 8, further comprising storage means for storing data representative of the icons together with the associated downlink message.

19. A secondary station as claimed in claim 9, further comprising storage means for storing data representative of the icons together with the associated downlink message.

20. A secondary station as claimed in claim 17, further comprising storage means for storing data representative of the icons together with the associated downlink message.

* * * * *